US005159200A

United States Patent [19]

Dunbar et al.

[11] Patent Number: 5,159,200

[45] Date of Patent: Oct. 27, 1992

[54] DETECTOR FOR SENSING HOT SPOTS AND FIRES IN A REGION

[75] Inventors: Robert A. Dunbar, Swampscott, Mass.; David W. Frasure, Ayden, N.C.

[73] Assignee: Walter Kidde Aerospace Inc., Wilson, N.C.

[21] Appl. No.: 685,298

[22] Filed: Apr. 12, 1991

[51] Int. Cl.[5] ............ G01J 5/08; G01J 5/62

[52] U.S. Cl. ............ 250/350; 250/342; 250/349; 250/351

[58] Field of Search ............ 250/347, 342, 351, 349, 250/350; 388/933

[56] References Cited

U.S. PATENT DOCUMENTS

| | | | |
|---|---|---|---|
| 1,959,702 | 5/1934 | Barker | 250/342 |
| 3,147,384 | 9/1964 | Fenton et al. | 250/347 |
| 3,953,108 | 4/1976 | Schmidt et al. | 350/382 |
| 4,051,370 | 9/1977 | Bly | 250/351 |
| 4,749,862 | 6/1988 | Yoshida et al. | 250/342 |
| 4,769,545 | 9/1988 | Fraden | 250/342 |
| 4,988,884 | 1/1991 | Dunbar et al. | 250/554 |
| 5,021,660 | 6/1991 | Tomita et al. | 250/351 |
| 5,059,953 | 10/1991 | Parsons et al. | 250/342 |

FOREIGN PATENT DOCUMENTS

| | | | |
|---|---|---|---|
| 1017837 | 1/1966 | United Kingdom | 388/933 |
| 2171513A | 8/1986 | United Kingdom . | |

OTHER PUBLICATIONS

"Fire Safety for Cargo bays", *Aerospace Engineering*, pp. 19-22 (Nov. 1990).

*Primary Examiner*—Carolyn E. Fields
*Attorney, Agent, or Firm*—Fish & Richardson

[57] ABSTRACT

A detector for detecting hot spots that includes an infrared sensor and a scanning component. The infrared sensor is fixedly mounted on a housing and is oriented to have a field of view of at least part of the region of interest. The scanning component is mounted in front of the infrared sensor and blocks most of the field of view of the infrared sensor and has a moving aperture that exposes the infrared sensor to a small area of the region at one time. The moving aperture provides a small instantaneous field of view and over time exposes the sensor to a much larger area.

39 Claims, 4 Drawing Sheets

DETECTOR FOR SENSING HOT SPOTS AND FIRES IN A REGION

BACKGROUND OF THE INVENTION

The invention relates to detectors for detecting hot spots in a region.

Flame detectors have been designed for and used in various environments. E.g., Dunbar U.S. Pat. No. 4,988,884 describes a flame detector specifically designed for use in aircraft. So-called "combi" aircraft, which use a deck for passengers or cargo or both, have special detection requirements. In these aircraft it is desired to detect a flame or hot spot (increased temperature region) for the different possible uses of the aircraft cabin. When used for cargo, there often are cargo containers that take up most of the space in the cabin and block a ceiling mounted detector from viewing anything except the tops of the containers; it is necessary to be able to detect either flames or hot spots on the container tops, which are very near to the ceiling. When the cargo containers are not present (whether used for passengers, palletized cargo, or even livestock), the cabin is much more open, and the region that needs to be viewed is much larger.

SUMMARY OF THE INVENTION

The invention features, in general, a detector for detecting hot spots that includes an infrared sensor and a scanning component. The infrared sensor is fixedly mounted on a housing and is oriented to have a field of view of at least part of the region of interest. The scanning component is mounted in front of the infrared sensor and blocks most of the field of view of the infrared sensor and has a moving aperture that exposes the infrared sensor to a small area of the region at one time. The moving aperture provides a small instantaneous field of view and over time exposes the sensor to a much larger area. Exposing the sensor to only a small area at one time facilitates the ability of the sensor to discriminate between large areas of relatively moderately increased temperature (e.g., a cargo container that may have been heated to near 150° F. or so while sitting in the sun on a runway) and small hot areas of the container surface owing to a fire inside the container.

In preferred embodiments there are one or more moving apertures that provide instantaneous fields of view in two axes. The apertures can rotate about a central axis of the detector, which would be a vertical axis for a ceiling mounted detector. Different apertures can have different angular fields of view with respect to the central axis. There can be a plurality of infrared sensors that each have a different and substantially complementary field of view of the region at different angular positions with respect to the central axis (e.g., four sensors that are mounted at angles of 45° with respect to the central axis and at 90° positions with respect to each other). Each infrared sensor has an independently analyzed output in order to better discriminate against large areas of moderately elevated temperature.

In some preferred embodiments, the scanning component is movable and provided by a rotating motorized cover that has an inner surface of low emissivity material (most preferably gold, which will not deteriorate) and has openings through it to provide the apertures. In some other preferred embodiments, the scanning component can be fixed and include a plurality of elements (e.g., liquid crystal elements) that are individually controllable to be transmissive or nontransmissive to infrared radiation, the elements, which can be considered pixels, being sequentially individually accessed to provide the moving apertures.

The infrared sensor can be a broadband pyroelectric sensor (e.g., one employing a $LiTaO_3$ sensing element) having an spectral bandpass filter that limits incoming radiation to between 2 and 10 microns (most preferably between 4 and 6 microns), in order to discriminate against surfaces with moderately increased temperatures and other sources of noise (e.g., lighting in the aircraft, lightning). Other sensors, e.g., other pyroelectric sensors, thermopiles, or devices that change in resistance, can also be used.

The detector includes discrimination circuitry that receives the output of the infrared sensor and compares it to a threshold value associated with a hot spot condition and provides a threshold-exceeded output when the threshold has been exceeded. To further avoid false alarms, the discrimination circuitry counts a predetermined number (e.g., 4) of the threshold-exceeded outputs in a time period during which there have been successive exposures to the same instantaneous field of view.

Other features and advantages of the invention will be apparent from the following description of preferred embodiments thereof and from the claims.

DESCRIPTION OF THE PREFERRED EMBODIMENTS

The preferred embodiments will now be described.

Drawings

Figure 1:
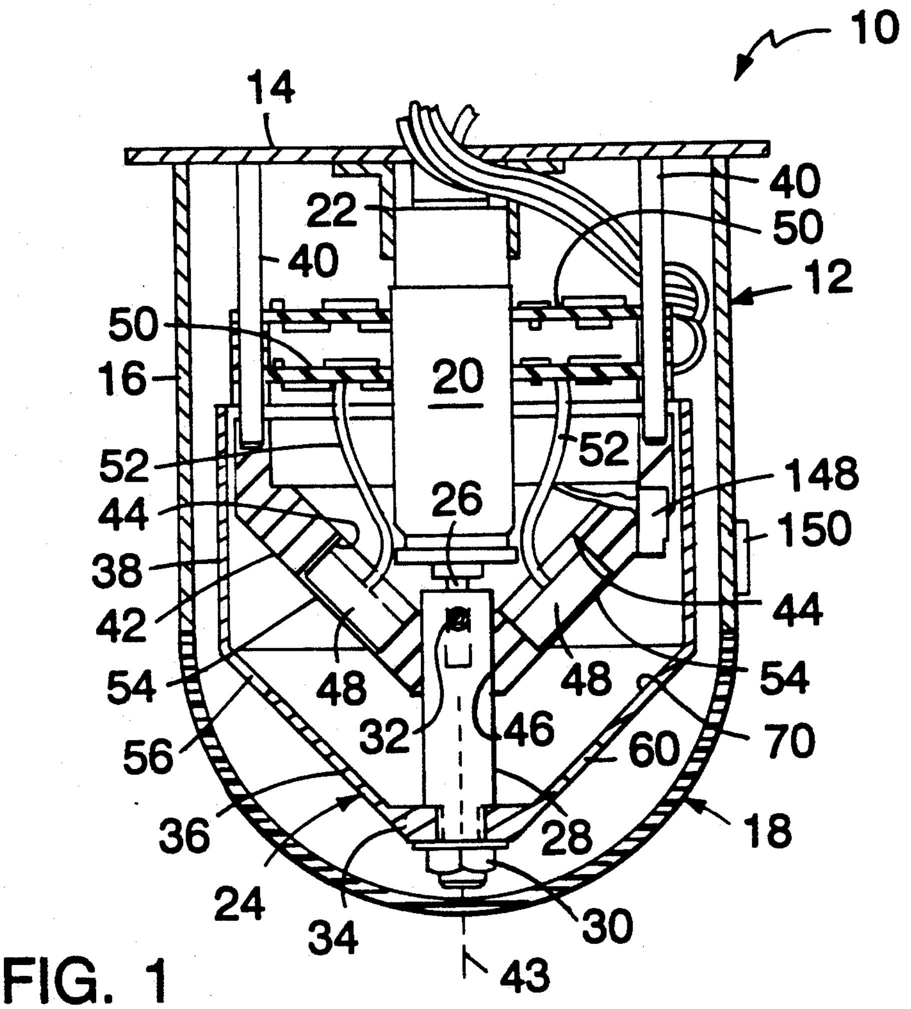
FIG. 1 is a vertical sectional view of a hot spot detector according to the invention.
Figure 3:
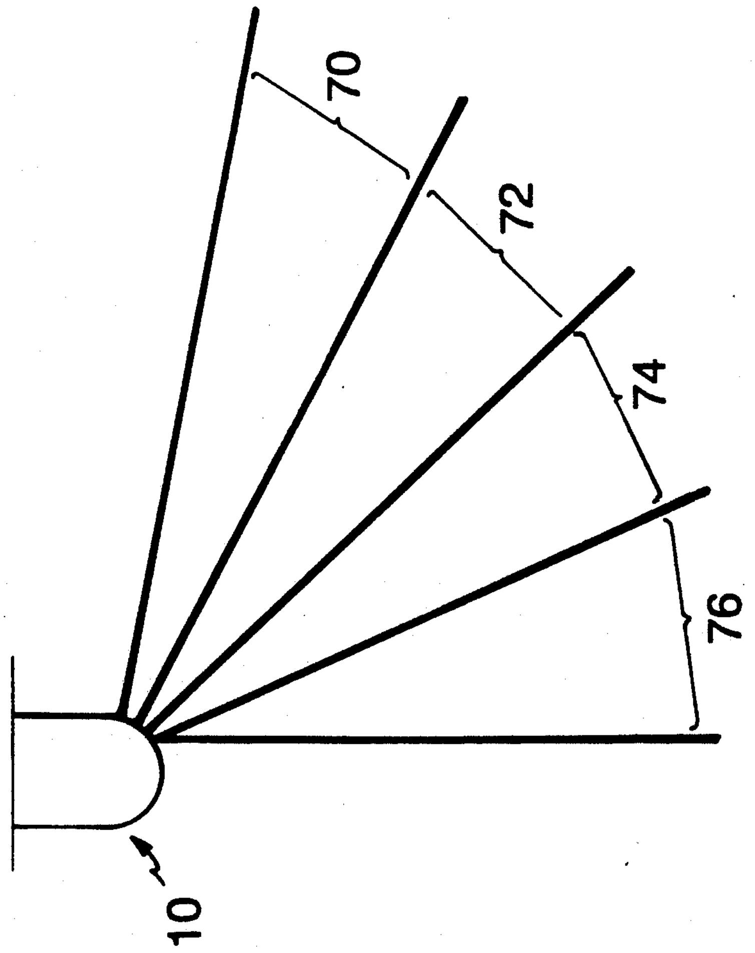
FIG. 3 is a diagram illustrating different fields of view provided by different apertures of the FIG. 2 scanning component.
Figure 3A:
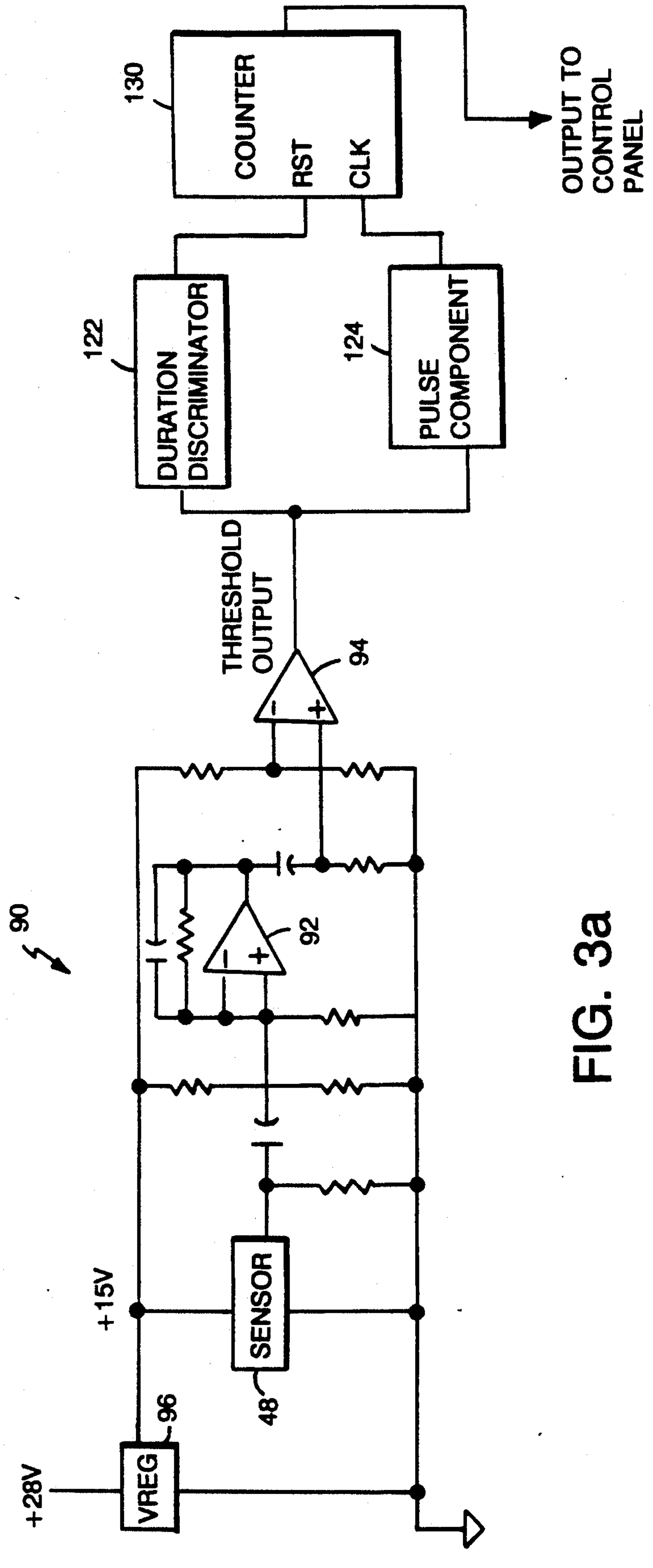

FIG. 3*a* is a circuit diagram showing electrical circuitry used in the FIG. 1 detector.

Figure 4:
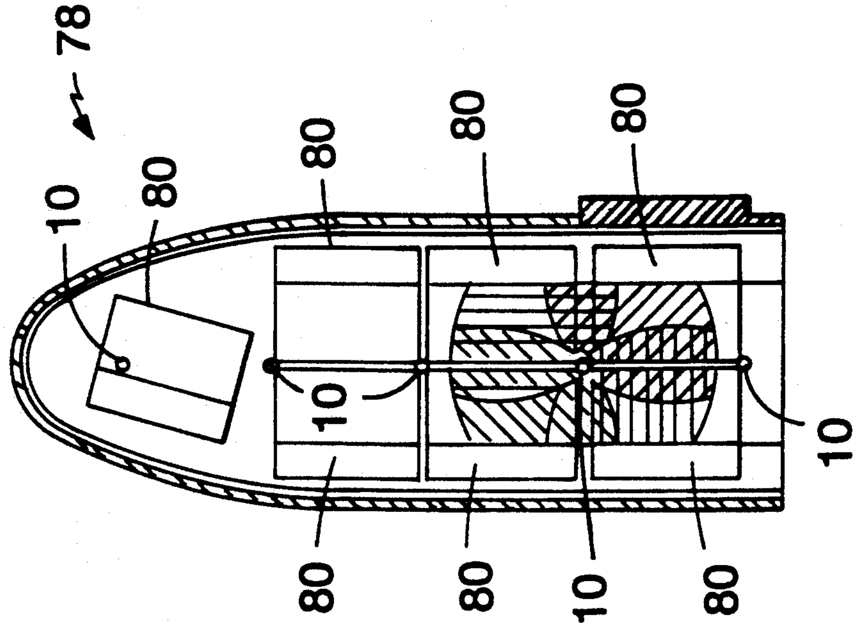

FIG. 4 is a floor plan showing placement and fields of view of a plurality of FIG. 1 detectors in a combi aircraft.

Figure 5:
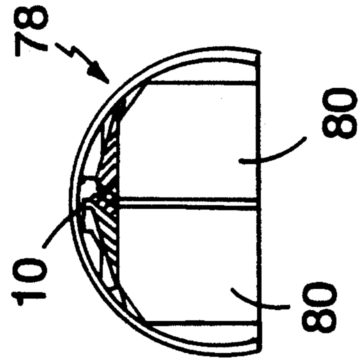

FIG. 5 is a partial vertical sectional view of an aircraft in which the FIG. 1 detector is used above cargo containers.

Figure 6:
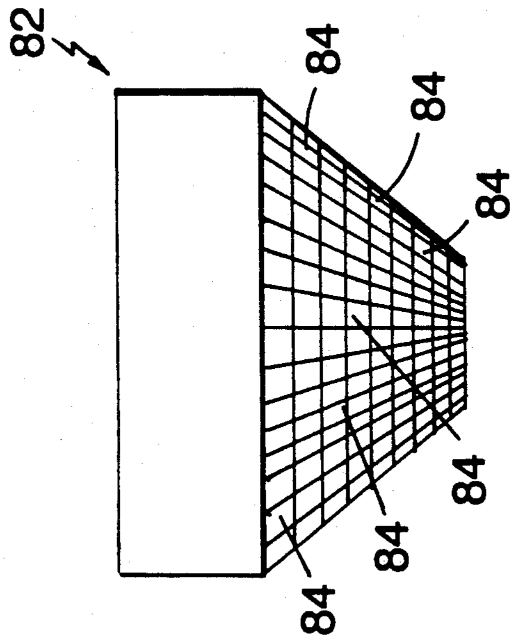

FIG. 6 is an elevation of an alternative, fixed scanning component for the FIG. 1 detector.

Structure

Referring to FIG. 1, there is shown fire and hot spot detector 10. It includes aluminum housing 12, which has a circular base plate 14 and cylindrical body 16, and outer plastic dome 18 at the bottom of body 16. Dome 18 is made of infrared and optically transparent plastic (e.g., an IR grade, high-density polyethylene available under the poly IR2 trade designation from Lectric Lights, Arlington, Va.). Motor 20 (a D.C. motor of aircraft quality) is mounted to housing base plate 14 via motor support 22. Rotating conical scanner 24 is secured to drive shaft 26 of motor 20 via rod 28, which is secured to scanner 24 via nut 30 and to drive shaft 26 via set screw 32. Scanner 24 has base 34, conical portion 36 (at a 45° angle to the horizontal), and cylindrical extension 38.

Support shafts 40 extend downward from base plate 14 outside of motor support 22. Sensor support wall 42 is secured to the bottoms of shafts 40. Wall 42 is generally conical (making a 45° angle with the horizontal) and has four holes 44 spaced from each other by 90° angles around axis of rotation 43 of rod 28 (also referred to as the central axis of detector 10) and central hole 46 at the bottom through which rod 28 extends and in which rod 28 rotates. Infrared sensors 48 are mounted in holes 44 and are electrically connected to printed circuit boards 50 via wires 52. Sensors 48 are broadband pyroelectric sensors having $LiTaO_3$ sensing elements. Spectral bandpass filters 54 (diagrammatically indicated on FIG. 1) are mounted at the inputs to sensors 48; these filters are optically coated to limit the input radiation to between 4 and 6 microns wavelength, the infrared radiation of interest. Two halogen, high-brightness bulbs 53 are mounted on wall 42 at 180° locations from each other; these bulbs are activated preflight to test that the sensors are working and that the interior surfaces, which are highly reflective, are clean.

Figure 2:
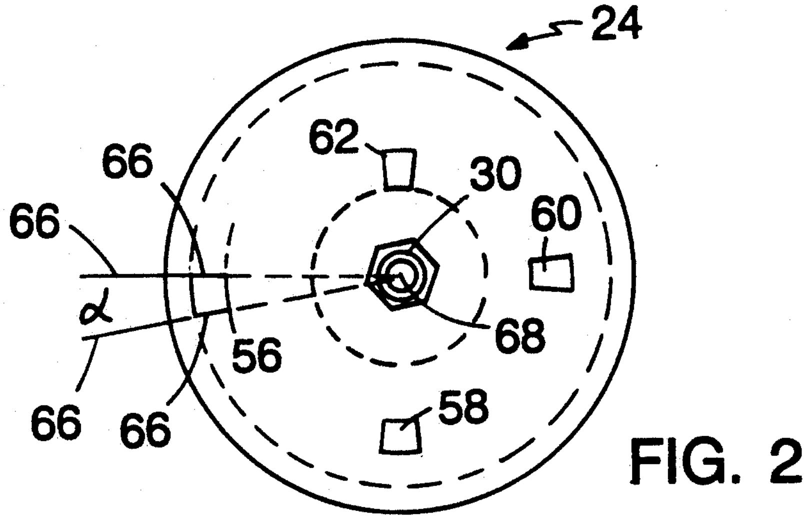
FIG. 2 is a bottom view of a rotating scanning component of the FIG. 1 detector.

Referring to FIGS. 1 and 2 (the latter being a bottom view), conical portion 36 of scanner 24 has four apertures 56, 58, 60, 62 that are spaced from each other by 90° around the axis of rotation 43 of rod 28 and located at different radial positions. Aperture 56 is at the uppermost and thus largest-radius position on conical portion 36. Aperture 58 is radially inward of aperture 56; aperture 60 is radially inward of aperture 58, and aperture 62 is radially inward of aperture 60 at the bottom of conical portion 36, just above base 34. Apertures 56–62 are generally trapezoidal in shape. The two sides 64 of aperture 56 are along rays 66 from the center point 68, which rays make an angle alpha between them. The sides of apertures 58, 60, 62 are along pairs of rays from center point 68 that also make an angle of the same magnitude as alpha between them. The radially inward sides of apertures 56, 58, and 60 are at the same radial positions as the radially outward sides of apertures 58, 60, and 62, respectively. Inner surface 70 of scanner 24 is coated with 24 Karat gold that has been polished to provide a low emissivity of 0.02 (ratio of radiant energy emitted by polished gold surface to that emitted by a blackbody of the same temperature). An advantage of gold is that it is stable and does not oxidize and thus retains its low emissivity characteristic.

Sensors 48 each have a 100° solid viewing angle that is equally distributed about a central viewing axis of the sensor. By mounting sensors 48 at 45° angles directed downward and outward at four positions around central axis 43 (i.e., each sensor central viewing axis makes a 45° angle with detector central axis 43) the combined field of view of the four sensors is all the way around the sensor from the floor to the ceiling with some overlap of the areas viewed by sensors. (This is illustrated by the four overlapping fields of view indicated for a detector 10 on FIG. 4, showing when cargo containers 80 occupy much of the region of interest of the aircraft and block much of the view of detectors 10.) Apertures 56, 58, 60, 62 are used to limit the instantaneous field of view of a sensor 48 to increase its sensitivity. The use of low emissivity material to coat the inner surface of scanner 24 also contributes to sensitivity and provides a very high signal-to-noise ratio. By rotating scanner 24, the regions viewed are moved so as to scan regions all the way around the detector 10. Referring to FIG. 3, it is seen that different regions 70, 72, 74, 76 are viewed by sensors 48 through apertures 56, 58, 60, 62, respectively. Region 70 begins about 10° from the horizontal to avoid viewing ceiling mounted lights. Regions 70, 72 and 74 are donut shaped, and region 76 is disk shaped. When a sensor 48 is viewing a region near the edge of its field of view, at an angle of about 45° with the sensor's central viewing axis, the radiation is about 0.707 as strong as it would be if it were directly in front of the sensor; this variation in signal strength, however, does not prevent detector 10 from detecting hot spots and discriminating against areas of moderately increased temperature, owing to the very high signal-to-noise ratio. This high signal-to-noise ratio permits detector 10 to be sensitive at the different distances to objects and for the different areas of objects viewed in the region under different use conditions and at different angles.

Referring to FIG. 3a, printed circuit boards 50 include an independently controlled discrimination circuit 90 for each infrared sensor 48. Each circuit 90 receives the output of a respective infrared sensor 48, amplifies it appropriately at amplifier 92, compares the amplified value to a threshold value associated with a hot spot condition at comparator 94, and provides a threshold-exceeded output when the threshold has been exceeded. The capacitor between the output of amplifier 92 and the +input to comparator 94 removes the D.C. component of the output signal of amplifier 92 and passes the A.C. component. A threshold value is provided to the - input to comparator 94. To avoid false alarms, before outputing an alarm condition, the discrimination circuitry counts a predetermined number (e.g., 4) of the threshold-exceeded outputs in a time period during which there have been successive exposures to the same instantaneous field of view. The discrimination circuitry of circuit 90 is similar to that shown in FIGS. 3 and 4 of Dunbar et al. U.S. Pat. No. 4,988,884, which is hereby incorporated by reference, except that a single-stage amplifier 92 is used in place of amplifier 110 (owing to use here of a more sensitive sensor) and different time periods are used for component 122 (referred to as a pulse component herein) and duration discriminator 124. In particular, a 2-second time period is used in place of the 0.25-second time period of component 122, and a 10-second time period is used in place of the 2.5-second time period of duration discriminator 124. Rotating scanner 24 rotates at 7.5 rpm, and the 10-second time period is used to guarantee that counter 130 is enabled (by the output of discriminator 124) to count the output pulses of component 122 only so long as hot spots continue to be detected during a successive revolution of rotating scanner 24. The 10-second period guarantees that scanner 24 will be able to rotate a complete time when looking for a repeat of a threshold exceeded condition (also referred to as a "signal event"), but it also will stop the count if there has been a revolution without a signal event between two revolutions with signal events. If counter 130 reaches a count of 4, it provides an output to a control panel in the aircraft cabin. Circuit 90 is powered by a 28-volt source, which is regulated at device 96 to provide 15 volts. Also included in detector 10 is a system for insuring that the motor is turning properly; a combined light source and adjacent phototransistor unit 148 is positioned to view alternating reflective and nonreflective portions of the interior surface of wall 38 as scanner 24 rotates, and a retriggerable one-shot (not shown) will change its output state to provide an alarm if it does not get a pulse in a time period related to the time it takes scanner 24 to rotate. Built-in thermal switch 150 in detector 10 provides back-up temperature monitoring of the ceiling area of the cargo bay. Detector 10 is also responsive to open flame. The fire source may be any flammable liquid, paper, wood, burning cloth or plastic. Detector 10 will respond to a fire equivalent in size to a 5" diameter panfire of diesel fuel anywhere within its prescribed viewing area.

Referring to FIGS. 4 and 5, detectors 10 are placed in combi aircraft 78 at the junctions of four containers 80 (10 feet, by 10 feet, by 8 feet deep) at the center of the cabin, about 2 feet above the tops of containers 80. As can be seen in FIG. 5, when containers 80 are in the cabin, only the tops are viewed by detector 10. The overlapping fields of view of the four sensors of a single detector 10 are shown in FIGS. 4 and 5. When the containers 80 are not present, detector 10 views without blind spots (except for some small regions blocked by the head liner of the cabin) the entire region under it in the cabin below the 10° angle above region 70 shown in FIG. 3. In this case the distance to the far corner of the region viewed could be up to 17 feet.

In operation, the use of the 4–6 micron filter cuts off substantial black body radiation from sources below 160° F. Because the majority of the field of instantaneous view of an infrared sensor 48 is of the low emissivity surface on the inside of scanner 24, and each sensor receives radiation through the aperture presently in front of it from only a very limited area, any localized hot spots viewed by a sensor 48 cause an abrupt change (i.e., a spike) in the output of the sensor. Detector 10 can detect a 6" by 6" 400° F. hot spot against a 160° F. background surface throughout the region viewed in the cabin, with or without containers.

An advantage of using fixed sensors 48 is that slip rings are not required to make electrical connections to them, as would be the case if a rotating sensor were used. The use of fixed (as opposed to rotating) sensors thus tends to increase reliability and decrease failures, false alarms, and repairs.

Referring to FIG. 6, fixed scanner 82 can be used in place of rotating cone scanner 24. Fixed scanner 82 has a two-axis grid of liquid crystal actuating apertures 84, which can also be considered pixels. Each aperture or pixel 84 is provided by a sandwiched unit including sapphire input and output windows and a layer of liquid crystal material therebetween in a discrete segment that is the size of the aperture. The input and output windows carry infrared-transparent silicon coatings that act like capacitor plates to activate individual apertures. The plates are electrically connected via conductive leads routed between segments to triggering circuitry that is operated to sequentially activate the liquid crystal apertures in a manner similar to the movement of apertures 56 to 62 in front of the infrared sensors 48. The liquid crystal material employed is transmissive to 4 to 14 micron infrared radiation when activated, and is reflective or opaque when not activated. The use of sapphire material inherently blocks out radiation greater than 6 microns in wavelength, limiting the radiation transmitted through an activated aperture to 4 to 6 microns in wavelength. The liquid crystal material is a polymer dispersed liquid crystal available from the Liquid Crystal Institute of Kent State University, Kent, Ohio and is a modification of such material presently used to control radiation in the 10–14 micron range.

OTHER EMBODIMENTS

Other embodiments of the invention are within the scope of the claims.

E.g., other numbers of sensors and apertures can be used, and the number of apertures can differ from the number of sensors. Other low emissivity surfaces could be used for the inner surface of scanner 24, e.g., polished aluminum (0.05), polished brass (0.03), polished copper (0.05), polished nickel (0.05), polished silver (0.03). Other sensors could be used, e.g., other pyroelectric sensors (e.g., those made of lead zirconate or strontium barium titanate), thermopiles (such as those made with bismuth antimony junctions), and devices that change resistance in the presence of energy (e.g., those made of lead sulphide or lead selenide). The filters could also be provided with spectral bandpass filters that transmit different ranges of wavelength, e.g., 2–10 microns.

Detector 10 also has application in detecting fire in other enclosed regions, e.g., other vehicles (whether cargo transport or not) and storage areas, particularly where it is necessary to distinguish between elevated background temperatures and small hot spots, and could also be used to detect hot spots in other areas, e.g., hot spots on a wall.

What is claimed is:

1. A detector for detecting hot spots in a region comprising
- a housing adapted to be mounted on a supporting surface in said region,
- a first infrared sensor that is fixedly mounted in said housing and is oriented to have a field of view of at least part of said region,
- a second infrared sensor that is fixedly mounted in said housing and has a different and substantially complementary field of view of at least part of said region, and
- a scanning component that is mounted in front of said infrared sensors to block most of said fields of view of said infrared sensors, said scanning component having a movable aperture that exposes said infrared sensors to a limited area of said region at one time, providing a limited instantaneous field of view and over time exposing said sensors to at least a portion of said region, said aperture being movable in two axes.

2. The detector of claim 1 wherein said detector has a central axis that extends from said housing to a central region of said region, and the plurality of infrared sensors are located around said central axis at different angular positions with respect to each other, and wherein said aperture is movable around said central axis.

3. The detector of claim 2 wherein said aperture is movable to provide instantaneous fields of view at different locations in said region around said central axis and at different angular orientations with respect to said central axis.

4. The detector of claim 3 wherein said scanning component includes a plurality of fixed elements that are individually controllable to be transmissive or non-transmissive to infrared radiation, whereby said elements can be individually accessed in turn to provide said moving aperture.

5. The detector of claim 4 wherein said elements are liquid crystal elements.

6. The detector of claim 1 further comprising discrimination circuitry that receives the output of each infrared sensor and compares said output to a threshold value associated with a hot spot condition and provides a threshold-exceeded output when said threshold value has been exceeded.

7. The detector of claim 6 wherein said circuitry counts a predetermined number of said threshold-exceeded outputs in a time period during which there have been successive exposures to the same instantaneous field of view.

8. The detector of claim 1 wherein said infrared sensors detect radiation having wavelengths between 2 and 10 microns.

9. The detector of claim 8 wherein said infrared sensors detect radiation having wavelengths between 4 and 6 microns.

10. The detector of claim 9 wherein each infrared sensor is a broadband sensor having an spectral bandpass filter that limits incoming radiation to between 4 and 6 microns.

11. The detector of claim 10 wherein each broadband sensor is a pyroelectric sensor.

12. The detector of claim 10 wherein each broadband sensor is a thermopile.

13. The detector of claim 10 wherein each broadband sensor is a device that changes resistance as function of energy.

14. The detector of claim 1 further comprising a thermal switch to provide back-up temperature monitoring.

15. The detector of claim 1 wherein said scanning component includes a plurality of fixed elements that are individually controllable to be transmissive or non-transmissive to infrared radiation, whereby said elements can be individually accessed in turn to provide said moving aperture.

16. The detector of claim 15 wherein said elements are liquid crystal elements.

17. A cargo storage enclosure having hot spot detection therein comprising walls at least partially defining an enclosed cargo storage region, a first infrared sensor that is fixedly on one of said walls and is oriented to have a field of view of at least part of said region, a second infrared sensor that is fixedly mounted on one of said walls and is oriented to have a different and substantially complementary field of view of at least part of said region, and a scanning component that is mounted in front of said infrared sensors to block most of said fields of view of said infrared sensors, said scanning component having a movable aperture that exposes said infrared sensors to a limited area of said enclosed region at one time, providing a limited instantaneous field of view and over time exposing said sensors to at least a portion of said enclosed region, said aperture being movable in two axes.

18. The enclosure of claim 17 wherein said walls are walls of a cargo transport vehicle.

19. The enclosure of claim 18 wherein said walls are walls of a combi aircraft adapted to carry cargo containers and/or passengers in said enclosed region.

20. The enclosure of claim 17 wherein the sensors are mounted in a housing, a central axis extends from said housing to a central region of said enclosed region, and the plurality of infrared sensors are located around said central axis at different angular positions with respect to each other, and wherein said aperture is movable around said central axis.

21. The enclosure of claim 20 wherein said aperture is movable to provide instantaneous fields of view at different locations in said enclosed region around said central axis and at different angular orientations with respect to said central axis.

22. The enclosure of claim 17 further comprising, for each said sensor, a discrimination circuit that receives the output of a said sensor and compares said output to a threshold value associated with a hot spot condition and provides a threshold-exceeded output when said threshold value has been exceeded.

23. The enclosure of claim 22 wherein said circuit counts a predetermined number of said threshold-exceeded outputs in a time period during which there have been successive exposures to the same instantaneous field of view.

24. The enclosure of claim 17 wherein said scanning component includes a plurality of fixed elements that are individually controllable to be transmissive or non-transmissive to infrared radiation, whereby said elements can be individually accessed in turn to provide said moving aperture.

25. The enclosure of claim 24 wherein said elements are liquid crystal elements.

26. A detector for detecting hot spots in a region comprising a housing adapted to be mounted on a supporting surface in said region, a first infrared sensor that is fixedly mounted in said housing and is oriented to have a field of view of at least part of said region, a second infrared sensor that is fixedly mounted in said housing and has a different and substantially complementary field of view of at least part of said region, and a scanning component that is mounted in front of said infrared sensors to block most of said fields of view of said infrared sensors, said scanning component having a plurality of movable apertures that expose said infrared sensors to different limited areas of said region at one time, providing limited instantaneous fields of view and over time exposing said sensors to at least a portion of said region, said apertures being positioned so that the cumulative limited instantaneous fields of view provide exposure in two axes.

27. The detector of claim 26 wherein said detector has a central axis that extends from said housing to a central region of said region, and the plurality of infrared sensors are located around said central axis at different angular positions with respect to each other, and wherein said apertures are movable around said central axis.

28. The detector of claim 27 wherein said apertures are movable to provide instantaneous fields of view at different locations in said region around said central axis and at different angular orientations with respect to said central axis.

29. The detector of claim 28 wherein said scanning component is a cover that has a plurality of openings through it to provide said apertures, and further comprising a motor that is mounted on said housing and rotates said cover.

30. The detector of claim 29 wherein said cover has an inner surface of low emissivity material.

31. The detector of claim 29 further comprising means for insuring that said motor is turning properly.

32. The detector of claim 31 wherein said means for insuring comprises a light source and an adjacent phototransistor positioned to view alternating reflective and nonreflective portions of the interior surface of said cover as said cover rotates.

33. The detector of claim 28 wherein said scanning component is a cover that has a plurality of openings through it to provide said plurality of apertures, said sensors having sensor viewing axes that pass from said sensors through said openings and are located at different angular orientations with respect to said central axis for different apertures, and further comprising a motor that is mounted on said housing and is a means for rotating said cover.

34. The detector of claim 33 wherein said cover has an inner surface of low emissivity material.

35. The detector of claim 34 wherein said low emissivity material is gold.

36. The detector of claim 33 wherein there are four said sensors, and said sensors are mounted to have central viewing axes at angles of about 45° with said central axis.

37. The detector of claim 33 further comprising, for each said sensor, a discrimination circuit that receives the output of said sensor and compares said output to a threshold value associated with a hot spot condition and provides a threshold-exceeded output when said threshold value has been exceeded.

38. The detector of claim 37 wherein said circuit counts a predetermined number of said threshold-exceeded outputs in a time period during which there have been successive exposures to the same instantaneous field of view.

39. A cargo storage enclosure having hot spot detection therein comprising walls at least partially defining an enclosed cargo storage region, a first infrared sensor that is fixedly mounted on one of said walls and is oriented to have a field of view of at least part of said region, a second infrared sensor that is fixedly mounted on one of said walls and is oriented to have a different and substantially complementary field of view of at least part of said region, and a scanning component that is mounted in front of said infrared sensors to block most of said fields of view of said infrared sensors, said scanning component having a plurality of movable apertures that expose said infrared sensors to different limited areas of said enclosed region at one time, providing limited instantaneous fields of view and over time exposing said sensors to at least a portion of said enclosed region, said apertures being positioned so that the cumulative limited instantaneous fields of view provide exposure in two axes.

* * * * *